United States Patent Office 3,644,435
Patented Feb. 22, 1972

3,644,435
6-ALKYL OR 6-ALKENYL-2,3-DIMETHOXY-5-HYDROXY-1,4-BENZOQUINONES AND HYDROQUINONES
Karl Folkers, 177 Gaya Road, Portola Valley, Calif. 94026; Joseph C. Catlin, 872 Colorado Ave., Palo Alto, Calif. 94303; and Glenn Doyle Daves, Jr., 1530 SE. Blakeney, Beaverton, Oreg. 97005
No Drawing. Filed June 20, 1968, Ser. No. 738,393
Int. Cl. C07c 49/74, 43/22
U.S. Cl. 260—396 R    13 Claims

ABSTRACT OF THE DISCLOSURE

The disclosure describes novel 6-alkyl and 6-alkenyl derivatives of 2,3 - dimethoxy - 5-hydroxy-1,4-benzoquinones and hydroquinones which are useful as antioxidants and inhibitors of succinoxidase and DPNH-oxidase in mitochondrial systems. The compounds are prepared by reacting 2,3 - dimethoxy - 5-hydroxy-1,4-benzohydroquinone with an allylic alcohol or by decomposing a diacylperoxide in the presence of 2,3-dimethoxy-5-hydroxy-1,4-benzoquinone.

BACKGROUND OF THE INVENTION

This invention relates to novel 2,3 - dimethoxy - 5-hydroxy-1,4-benzoquinones and hydroquinones and to the process for preparing the same. More particularly, the invention relates to 6-alkyl and 6-alkenyl derivatives of such benzoquinones, and especially those compounds containing isoprenoid substituents in the 6-position.

The compounds of this invention are structurally similar to the 2,3 - dimethoxy - 5-methyl-6-alkyl-1,4-benzoquinones described and claimed in U.S. Pat. application Ser. No. 757,464, filed Aug. 27, 1958 in the name of Folkers et al., now abandoned. However, the present 5-hydroxy compounds differ significantly from the 5-methyl compounds of said prior application. Generally the 5-methyl compounds have activity similar to that of coenzyme Q and the 5-hydroxy compounds do not have activity in the two enzyme systems requiring the functionality of coenzyme Q. In even greater contrast, the 5-hydroxy compounds are antagonists of coenzyme Q. The antioxidant activity of the 5-hydroxy compounds in the absence of the coenzymatic activity of the 5-methyl compounds makes them particularly useful antagonists.

SUMMARY OF THE INVENTION

The novel compounds of this invention are benzoquinones and hydroquinones which may be represented by the structures

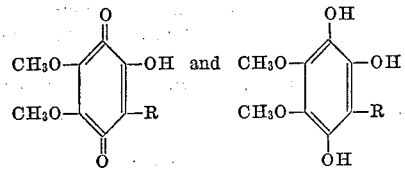

wherein R is alkyl or alkenyl, preferably higher alkyl or higher alkenyl, and most preferably isoprenoid.

Higher alkyl, as that term is used herein, refers to alkyl and alkenyl substituents containing at least about 5 carbon atoms. Preferably, R will contain from about 10 to about 50 carbon atoms.

Examples of suitable R groups which may be present include the following: alkyl groups $C_xH_{(2x+1)}$ wherein $x$ is an integer of at least about 5 and preferably from about 10 to about 50, or, more specifically (—$CH_2$—)$_x$H or [—$CH_2CH_2CH(CH_3)CH_2$—]$_n$H wherein $n$ is an integer, preferably from about 1 to 10; alkenyl groups, such as groups containing the structures

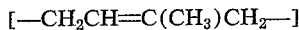

or (—CH=CH—). Specific alkenyl groups which may be present include those of the structure

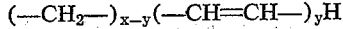

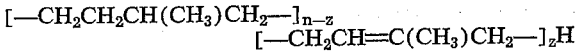

and [—$CH_2CH=C(CH_3)CH_2$—]$_n$H wherein $y$ is an integer less than $x$ and $z$ is an integer less than $n$. Preferably each of $y$ and $n$ will be of the order of about 1 to about 5. In such alkenyl groups, $n$ will be at least 2. It will be understood that the above exemplary representations do not specify the order of saturated and unsaturated moieties in the group R, any arrangement of saturated and unsaturated linkages being suitable. The group R may bear one or more inert substituents, preferably hydrocarbon substituents such as cycloalkyl and cycloalkenyl groups.

In accordance with the above description, R can be amyl, hexyl, heptyl, octyl, decyl, dodecyl, tetradecyl, pentadecyl, hexadecyl, heptadecyl, octadecyl, nonadecyl eicosyl tetracosyl, pentacosyl, cyclohexyloctyl, cyclohexenyoctyl, hexenyl, octenyl, decenyl, dodecenyl, tetradecenyl, heptadecenyl, eicosenyl, tricosenyl, tetracosenyl, decadienyl, dodecadienyl, heptadecadienyl, dodecatrienyl, pentadecatrienyl, heptadecatrienyl, nonadecatetrenyl, nonadecapentenyl, geranyl, farnesyl, tetraprenyl, solanesyl, decaprenyl, phytyl, octahydrotetraprenyl, etc. The preferred R groups are those containing isoprenoid substituents.

The compounds of the invention can be prepared from known and available starting materials. For example, 2,3-dimethoxyphenol is converted to 2,3-dimethoxy-1,4-benzoquinone, which is in turn used to prepare 1,4,5-trihydroxy - 2,3 - dimethoxybenzene. The last-named compound or the corresponding quinone is converted into the compounds of the invention by 6-alkylation. The reaction sequence is illustrated as follows:

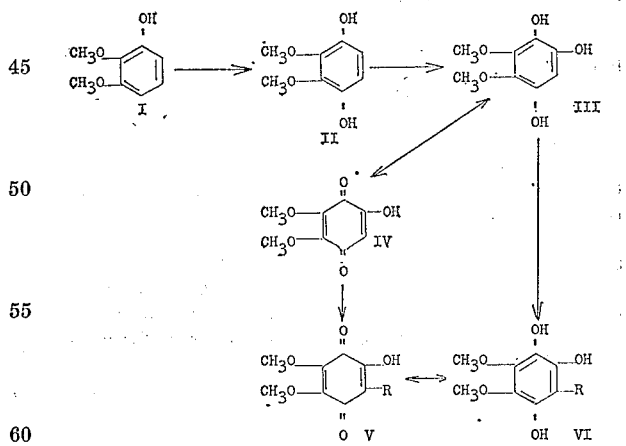

In each case, the quinone is converted into the corresponding hydroquinone by conventional reduction, such as by hydrogenation in the presence of a catalyst typified by platinum, palladium or Raney nickel; or by use of reducing agents typified by sulfur dioxide, sodium hydrosulfite, zinc and acetic acid, or sodium borohydride. Conversely, the quinone is prepared from the corresponding hydroquinone by mild oxidation, such as by air, silver oxide or ferric chloride.

Where R is isoprenoid, alkylation is most conveniently effected by acid-catalyzed reaction of the trihydroxy compound III with the appropriate allylic alcohol, R—OH, having the terminal group $$HOCH_2CH=C(CH_3)CH_2-$$

or

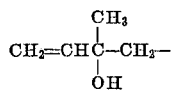

Such alcohols may be natural products such as phytol or geranol, or synthetic alcohols such as 3,7-dimethyl-1-octen-3-ol; 3,7,11-trimethyl-1-dodecen-3-ol; 3,7,11,15,19-pentamethyl - 1-eicosen-3-ol; 3,7,11,15,19,23-hexamethyl-1-tetracosen-3-ol and 3,7,11,15,19,23,27-heptamethyl-1-octacosen-3-ol. The reaction is carried out in the presence of acidic condensing agents such as potassium acid sulfate, zinc chloride, oxalic acid, boron trifluoride, and aluminum chloride; this will effect the condensation between the hydroquinone III and the alcohol. The condensation is carried out in an inert solvent such as dioxane, ether, or dimethoxy ethane at a temperature of from about 0° when aluminum chloride is used as the condensing agent to 75° when potassium acid sulfate is used. Boron trifluoride works well at room temperature. The reaction may be carried out in the open but will be conducted in an inert atmosphere (nitrogen) where it is desired to obtain the product in the hydroquinone form.

Non-isoprenoid R groups are most readily prepared by decomposing the corresponding diacyl peroxide, $$RC(O)OOC(O)R$$

in the presence of quinone compound IV. If desired, all or a part of the unsaturated bonds in the substituent R may be hydrogenated by catalytic hydrogenation.

The products are preferably purified by chromatographic separation of the compounds in either the hydroquinone or quinone form. Generally, the hydroquinones will be air-oxidized to the quinones during work-up. Location of the desired compounds is facilitated by the fact that they are violet in color on silica gel G, yellow in organic solvent solution, and red in solid form. The appropriate band of chromatographic medium can thus be readily located, physically separated, and eluted with a suitable solvent such as ether or hexane-ether.

The compounds are useful antioxidants since, in vivo, the quinone form is reduced and is in biological equilibrium with the hydroquinone. The 5-hydroxybenzoquinones are useful as inhibitors of the succinoxidase and DPNH-oxidase systems of intact mitochondrial systems or those extracted to remove coenzyme Q10 and are thus useful in studies of the vitamin-like activity of coenzyme Q. The compounds are useful in inhibiting oxidative rancidity which occurs during the storage and handling of oleaginous materials such as vegetable and animal oils and fats. The addition of an amount of 0.05 to about 1% by weight of the compounds of the invention to an oleaginous material such as corn oil will inhibit the formation of peroxides which are indicative of the occurrence of rancidity.

Preparation, purification and properties of representative compounds of the invention are illustrated by the following examples. It will be understood, however, that the invention is not limited to the specific embodiments described.

EXAMPLES 1–7

Isoprenylation of 2,3-dimethoxy-5-hydroxy-1,4-benzohydroquinone

To a solution of 1.9 g. (0.01 mole) of 2,3-dimethoxy-5-hydroxy-1,4-benzohydroquinone in 25 ml. of dry dioxane there is added an equivalent amount of the appropriate isoprenoid alcohol (in cases where the alcohol is expensive or difficult to obtain, less than an equivalent amount is used). The dioxane solution is protected by a drying tube and is stirred vigorously while 1.5 ml. of redistilled boron trifluoride etherate is added dropwise. The reaction mixture is stirred for two hours and then poured into 100 ml. of water. The product is extracted into ether, and the ether solution is dried over sodium sulfate, filtered and concentrated under reduced pressure. The residue is purified by layer chromatography on silica gel plates (20 cm. x 20 cm. x 1 mm.) using 4:1 benzenemethanol as the solvent. The violet band is scraped and eluted with ether to obtain the desired 2,3-dimethoxy-5-hydroxy-6-isoprenoid-1,4-benzoquinone. Alternatively, the reaction product is purified by column chromatography on silica gel, using hexane-ether as the solvent.

Following this procedure, the 6-geranyl, farnesyl, tetraprenyl, solanesyl, decaprenyl, and phytyl compounds are prepared. The 6-octahydrotetraprenyl derivative is made by dissolving 0.26 g. of the 6-phytyl compound in ethanol and hydrogenating at 35 p.s.i. of hydrogen in the presence of 0.1 g. of 10% Pd/C, then purifying as above.

EXAMPLES 8–12

Alkylation of 2,3-dimethoxy-5-hydroxy-1,4-benzoquinone

To a dioxane solution of 5 g. of 2,3-dimethoxy-5-hydroxy-1,4-benzohydroquinone there is added 7 g. of silver oxide, and the resulting mixture is shaken for one hour. The reaction mixture is then filtered and concentrated under reduced pressure. The quinone so obtained is combined with 0.05 mole of the appropriate diacylperoxide in 100 ml. of acetic acid and heated overnight on a steam bath. Acetic acid is distilled off under reduced pressure and the residue is taken up in hexane, placed on a silica gel column, and eluted with increasing fractions of ether in hexane. Alternatively, the compounds are purified by layer chromatography on silica gel as described in Examples 1–7.

By this technique, there are prepared the 6-penta-decyl, heptadecyl, nonadecyl, (8', 11', 14'-heptadecatrienyl), and (8'-cyclohexyl) octyl derivatives of 2,3-dimethoxy-5-hydroxy-1,4-benzoquinone.

The structures of the noted compounds are demonstrated by the spectra of the isolated products, as shown in Table I, in which UV spectral data and NMR data for the compounds are tabulated. Akylation on carbon and not on oxygen is indicated by the absence of a ring proton and

TABLE I.—SPECTRAL DATA OF 2,3-DIMETHOXY-5-HYDROXY-6-R-1,4-BENZOQUINONES

| R | UV ethanol $\lambda_{max.}$ (mμ) | NMR | | | |
|---|---|---|---|---|---|
| | | Vinyl | Methoxyls | Benzylic | Alkyl |
| Geranyl | 298 | 5.0 (m) | 6.00 (c) | 6.17 (s) | 7.02 (d) | 8.0–9.0 (m). |
| Farnesyl | 297 | 5.0 (m) | 6.00 (s) | 6.16 (s) | 7.00 (d) | 7.7–9.0 (m). |
| Tetraprenyl | 297 | 5.0 (m) | 6.00 (s) | 6.16 (s) | 7.00 (d) | 7.7–9.0 (m). |
| Solanesyl | 297 | 4.98 (m) | 6.00 (s) | 6.16 (s) | 7.00 (d) | 7.7–9.0 (m). |
| Decaprenyl | 297 | 4.98 (m) | 6.00 (s) | 6.16 (s) | 7.00 (d) | 7.8–9.0 (m). |
| Phytyl | 297 | 4.98 (t) | 5.98 (s) | 6.14 (s) | 6.99 (d) | 7.6–9.3 (m). |
| Octohydrotetraprenyl | 297 | | 5.98 (s) | 6.16 (s) | 7.00 (d) | 7.4–9.4 (m). |
| Pentadecyl | 299 | | 6.00 (s) | 6.15 (s) | 7.68 (m) | 8.5–9.3 (m). |
| Heptadecyl | 297 | | 6.00 (s) | 6.15 (s) | 7.72 (m) | 8.4–9.5 (m). |
| Nonadecyl | 299 | | 6.01 (s) | 6.18 (s) | 7.70 (m) | 8.4–9.5 (m). |
| 8',11',14'-heptadecatrienyl | 299 | 5.74 (m) | 5.99 (s) | 6.14 (s) | (a) | 7.2–9.2 (m). |
| 8'-(cyclohexyl)-octyl | 297 | | 6.01 (s) | 6.17 (s) | 7.70 (m) | 8.2–9.5 (m). | a The absorption of the benzylic protons falls within the range of the absorption of the alkyl protons.

the presence of benzylic protons at tau 6.9–7.7 in the NMR spectra; these protons would be found at tau 5.3–5.9 when the carbon is attached to oxygen. NMR spectra are obtained using carbon tetrachloride solutions with a Varian Associates HR 100 spectrometer. In Table I, values are in tau units and the letters in parentheses refer to peak shape: s=singlet, d=doublet, t=triplet, m=multiplet.

The activity of the compounds as inhibitors of succinoxidase and DPNH-oxidase in intact or coenzyme Q-extracted mitochondrial systems is shown by the data in Tables II and III.

5. A compound according to claim 1 wherein R is solanesyl.
6. A compound according to claim 1 wherein R is decaprenyl.
7. A compound according to claim 1 wherein R is phytyl.
8. A compound according to claim 1 wherein R is octahydrotetraprenyl.
9. A compound according to claim 1 wherein R is pentadecyl.
10. A compound according to claim 1 wherein R is heptadecyl.

TABLE II.—HYDROXYQUINONES IN THE DPNH-OXIDASE AND SUCCINOXIDASE SYSTEMS

| | Intact mitochondrial systems | | | | | | | |
|---|---|---|---|---|---|---|---|---|
| | DPNH-oxidase | | | | Succinoxidase | | | |
| Addition a | Specific activity b | Percent | Specific activity b | Percent | Specific activity b | Percent | Specific activity b | Percent |
| None | 0.396 | 65 | 0.406 | 50 | 0.452 | 85 | 0.366 | 80 |
| CoQ10 | 0.596 | 100 | 0.794 | 100 | 0.533 | 100 | 0.445 | 100 |
| CoQ10 plus 2,3-dimethoxy-5-hydroxy-6-farnesyl-1,4-benzoquinone | | | 0.608 | 75 | 0.309 | 60 | | |
| CoQ10 plus 2,3-dimethoxy-5-hydroxy-6-solanesyl-1,4-benzoquinone | 0.364 | 60 | | | 0.164 | 30 | | |
| CoQ10 plus 2,3-dimethoxy-5-hydroxy-6-phytyl-1,4-benzoquinone | See Table III | | | | | | 0.129 | 30 |
| CoQ10 plus 2,3-dimethoxy-5-hydroxy-6-dihydrophytyl-1,4-benzoquinone | 0.302 | 50 | | | | | 0.096 | 20 |
| CoQ10 plus 2,3-dimethoxy-5-hydroxy-6-nonadecyl-1,4-benzoquinone | 0.316 | 50 | | | 0.117 | 20 | | | a In each case, 100 mμ moles of the quinones is added.
b μatoms of oxygen/min./mg. of protein.

TABLE III.—2,3-DIMETHOXY-5-HYDROXY-6-PHYTYL-1,4-BENZOQUINONE (HPB) IN THE DPNH-OXIDASE AND SUCCINOXIDASE SYSTEMS

| | Enzyme activity | | | | | |
|---|---|---|---|---|---|---|
| | DPNH-oxidase | | | | Succinoxidase | |
| | Extracted mitochondria | | Intact mitochondria | | Intact mitochondria | |
| Addition | Specific activity a | Percent | Specific activity a | Percent | Specific activity a | Percent |
| None | b 0.056 | 0 | 0.392 | 50 | 0.296 | 95 |
| CoQ10 (100 mμmoles) | 0.344 | 100 | 0.813 | 100 | 0.308 | 100 |
| HPB (100 mμmoles) | | | 0.168 | 20 | 0.0025 | 0 |
| CoQ10 (100 mμmoles) plus HPB (50 mμmoles) | 0.256 | 70 | 0.569 | 70 | 0.098 | 30 |
| CoQ10 (100 mμmoles) plus HPB (100 mμmoles) | 0.188 | 45 | 0.306 | 40 | 0.048 | 15 |
| CoQ10 (100 mμmoles) plus HPB (200 mμmoles) | 0.041 | 0 | 0.066 | 10 | 0.035 | 10 |
| CoQ10 (200 mμmoles) plus HPB (50 mμmoles) | | | 0.700 | 85 | 0.093 | 30 | a μatoms of oxygen/min./mg. of protein.
b When the enzyme is extracted, any respiration is assumed to be due to unextracted coenzyme Q. The blank is subtracted from each value obtained.

What is claimed is:
1. A compound selected from the group consisting of

wherein R is an alkyl or alkenyl group having 10 to 50 carbon atoms.
2. A compound according to claim 1 wherein R is geranyl.
3. A compound according to claim 1 wherein R is farnesyl.
4. A compound according to claim 1 wherein R is tetraprenyl.

11. A compound according to claim 1 wherein R is nonadecyl.
12. A compound according to claim 1 wherein R is 8′,11′,14′-heptadecatrienyl.
13. A compound according to claim 1 wherein R is 8′-(cyclohexyl)octyl.

References Cited

UNITED STATES PATENTS 3,080,384   3/1963   Kofler et al. _____ 260—396
3,349,113   10/1967  Gloor et al. _____ 260—396

LORRAINE A. WEINBERGER, Primary Examiner

L. A. THAXTON, Assistant Examiner

U.S. Cl. X.R.
260—613 D, 999